Figure 1:
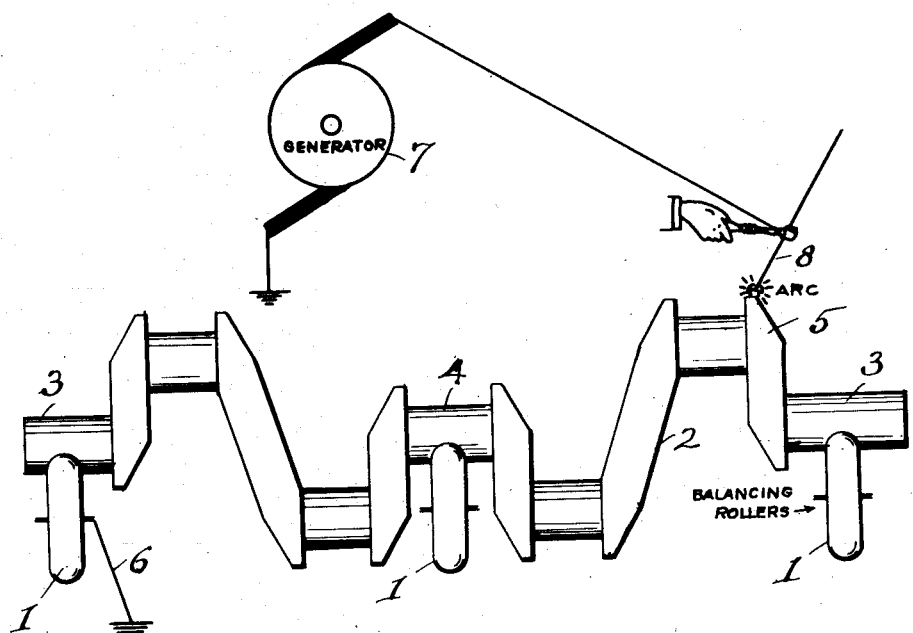

April 8, 1924.

C. E. DAVID 1,489,699

METHOD OF BALANCING MACHINE PARTS

Filed July 11, 1922

WITNESSES:

INVENTOR:

Patented Apr. 8, 1924.

1,489,699

UNITED STATES PATENT OFFICE.

CARL E. DAVID, OF CLEVELAND, OHIO.

METHOD OF BALANCING MACHINE PARTS.

Application filed July 11, 1922. Serial No. 574,211.

*To all whom it may concern:*

Be it known that I, CARL E. DAVID, a citizen of the United States, residing at Cleveland, in the county of Cuyahoga and State of Ohio, have invented a certain new and useful Improvement in Methods of Balancing Machine Parts, of which the following is a full, clear, and exact description.

This invention relates to a method of balancing machine parts, particularly revolving parts such as crank shafts, fly wheels, gears, etc., which in order to avoid damage to the bearings and through vibration to the entire machine, must be in balanced condition.

It is necessary that the revolving part be in static balance, i.e., that the weight of the machine part be equally distributed around the axis of rotation, and also that the revolving part be in running balance, i. e., that the weight be so distributed lengthwise of the axis of rotation that the rotation thereof does not tend to cause eccentric movement of the part in its bearings.

To test a machine for either static or running balance, it is common practice to provide balance indicating devices upon which the part to be balanced may be placed, and which indicate the condition of the part with respect to its static balance or with respect to its running balance. In both instances the balance indicating device ordinarily comprises sets of rolls adapted to support the part with its axis horizontal. For indicating static balance the rolls are idle and the heavy portion of the machine part swings downwardly by gravity. For indicating running balance, the balance indicating device is provided with means for rotating the part being tested and for indicating the condition of the part with respect to its running balance.

Balance testing machines may be and often are designed to indicate both running and static balance. In the operation of balancing machine parts the common practice has been to test the part to be balanced and then to remove the part from the testing device and by grinding, filing, drilling or in some other manner to remove some of the metal from portions of the part which the balance indicating device has shown to be of excess weight.

It is usually necessary to test the part being balanced again and again removing smaller and smaller quantities of metal after each test until a satisfactory balance is obtained.

If too much metal is removed from one portion of the part being balanced, it becomes necessary to remove metal from an opposite portion. A high degree of skill on the part of the operator is required and the operation due to the handling to and from the testing machine is tedious and expensive, adding very considerably to the cost of manufacture.

An object of the present invention is to provide a less tedious and expensive method of balancing such machine parts, by providing a method by which it is possible to balance the machine parts without removing it from the balance indicating or testing machine.

A further object is to provide a method in which the proper balance is obtained by welding increments of metal to appropriate portions of the part being balanced whereby weakening by removal of metal and unsightly irregularities on the surface of the part are avoided.

The process which I am proposing differs from former practice in that metal is added to the light portions of the member being balanced instead of being subtracted from the heavy portions. This is accomplished by welding in a suitable manner enough metal to the light portions of the member to secure proper balance. An advantage of the improved process is that it is unnecessary to remove the piece from the balance testing machine while it is being balanced.

A further advantage is that the welding on of a given amount of metal is much more rapid than the removal of the same amount and an additional saving is thereby effected besides that of the reduced handling cost.

Various methods of welding can be employed, however, it is desirable that the application of heat be localized so that the effects of any heat treatment to which the part has previously been subjected is not impaired and the strength of the part is not diminished. The welding can be performed by an acetylene torch or by arc welding but owing to the convenience of operation and the intense but local heating effect, metallic arc welding is preferred.

Figure 2:
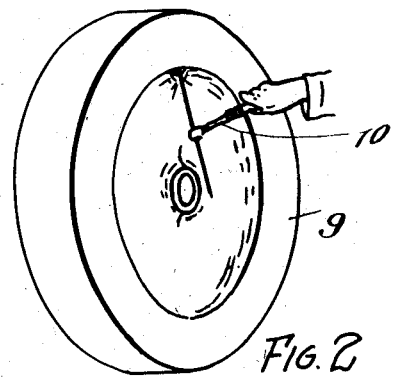

Reference should be had to the accompanying drawings forming a part of this specification in which Fig. 1 is a diagrammatic view showing the manner of applying the metal in balancing a crank shaft; Fig. 2 is a view showing the application of the method to balancing a fly wheel.

Referring to the accompanying drawings, the numeral 1 indicates the supporting rolls of a balance indicating device. The showing in Fig. 1 is diagrammatic. The rolls 1 may be the supporting rolls of a device for indicating static balance or of a device for indicating running balance, or of a machine for indicating both running and static balance.

As shown in Fig. 1 a crank shaft 2 is shown in position upon the balancing rolls 1. The crank shaft 2 has end crank pins 3 and a central crank pin 4 in axial alignment and resting upon sets of supporting rolls 1. Between the end pins 3 and central pin 4 the crank shaft has eccentric portions 5. To enable metal to be welded to the crank shaft while upon the balancing rollers, one of the roller sets will be provided with a connection 6 to ground.

An arc welding set is indicated diagrammatically in Fig. 1 consisting of a suitable generator 7 suitably connected to the metallic electrode 8. In the operation of balancing the crank shaft it is placed upon the balancing rollers 1. The crank shaft will swing by gravity until the heavier portions thereof are lowermost. The operator then adds metal to the uppermost of lighter portions by striking arcs at suitable places between the metallic electrode 8 and the crank shaft. Static balance can thus be quickly obtained.

To obtain running balance, the balance testing machine is operated until it is determined where along the length of the crank shaft metal should be added to obtain running balance. The necessary metal is then added at this point, care being taken to place equal amounts on opposite sides of the axis so that static balance is maintained. A skillful operator can weld the necessary amount of metal to desired portions of the crank shaft substantially without spluttering or scattering the metal so that there is no danger of fouling the bearings of the balancing machine as is the case when it is attempted to file or grind the part being balanced without removing it from the balancing rollers.

In Fig. 2 of the drawing is shown the method of adding metal to a fly wheel 9 by passing an arc from a metallic electrode 10. The fly wheel 9 will be supported with its axis horizontal on suitable balancing rollers.

Having described my invention, I claim:

1. The method of balancing a metallic machine part, which consists in placing said machine part upon a balance indicating device, and integrally uniting increments of moulten metal to said machine part upon any appropriate portion thereof lacking the weight necessary for the desired condition of balance and in any quantity necessary to obtain the desired condition of balance, said metal being added while said machine part is on the said balance indicating device.

2. The method of balancing a metallic machine part which consists in placing said machine part upon a balance indicating device, and integrally uniting increments of metal to appropriate portions of said machine part while on said balance indicating device by striking arcs between a metallic electrode and any suitable portion of the machine part lacking the weight necessary for the desired condition of balance until the weight necessary to obtain the desired condition of balance has been added.

3. The method of balancing a metallic machine part, which consists in alternately testing said part for balance and integrally uniting gradually decreasing increments of molten metal to appropriate portions thereof.

4. The method of balancing a metallic machine part, which consists in alternately testing said part for balance and integrally uniting increments of molten metal to any appropriate portions thereof by metallic arc welding, said added increments of metal being in any desired amount determined by the testing.

In testimony whereof, I hereunto affix my signature.

CARL E. DAVID.